(12) United States Patent
Haas et al.

(10) Patent No.: US 7,512,574 B2
(45) Date of Patent: Mar. 31, 2009

(54) CONSISTENT HISTOGRAM MAINTENANCE USING QUERY FEEDBACK

(75) Inventors: Peter Jay Haas, San Jose, CA (US);
Volker Gerhard Markl, San Jose, CA (US); Nimrod Megiddo, Palo Alto, CA (US); Utkarsh Srivastava, Stanford, CA (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 11/239,044

(22) Filed: Sep. 30, 2005

(65) Prior Publication Data
US 2007/0078808 A1    Apr. 5, 2007

(51) Int. Cl.
G06E 1/00 (2006.01)
G06E 3/00 (2006.01)
G06F 15/18 (2006.01)
G06G 7/00 (2006.01)

(52) U.S. Cl. ....................................................... 706/17
(58) Field of Classification Search ........................ None
See application file for complete search history.

(56) References Cited

U.S. PATENT DOCUMENTS

| | | | |
|---|---|---|---|
| 6,278,989 B1 | 8/2001 | Chaudhuri et al. | |
| 6,460,045 B1 | 10/2002 | Aboulnaga et al. | |
| 6,507,840 B1 | 1/2003 | Ioannidis et al. | |
| 7,007,039 B2 * | 2/2006 | Chaudhuri et al. | 707/200 |
| 7,162,081 B2 * | 1/2007 | Timor et al. | 382/168 |
| 7,176,828 B2 * | 2/2007 | Tirkel et al. | 342/22 |
| 7,184,929 B2 * | 2/2007 | Goodman | 702/181 |
| 7,191,119 B2 * | 3/2007 | Epstein et al. | 704/10 |
| 7,194,134 B2 * | 3/2007 | Bradshaw | 382/226 |
| 7,219,035 B2 * | 5/2007 | Goodman | 702/181 |
| 7,252,948 B2 * | 8/2007 | Gingeras et al. | 435/6 |
| 7,263,222 B2 * | 8/2007 | Manbeck et al. | 382/167 |
| 7,263,243 B2 * | 8/2007 | Chen et al. | 382/294 |
| 7,305,129 B2 * | 12/2007 | Chellapilla et al. | 382/174 |
| 7,321,699 B2 * | 1/2008 | Johnson et al. | 382/254 |
| 7,333,923 B1 * | 2/2008 | Yamanishi et al. | 703/2 |
| 7,336,430 B2 * | 2/2008 | George et al. | 359/708 |

(Continued)

OTHER PUBLICATIONS

Brightness preserving histogram equalization with maximum entropy: a variational perspective Chao Wang; Zhongfu Ye; Consumer Electronics, IEEE Transactions on vol. 51, Issue 4, Nov. 2005 pp. 1326-1334 Digital Object Identifier 10.1109/TCE.2005. 1561863.*

(Continued)

*Primary Examiner*—Michael B Holmes
(74) *Attorney, Agent, or Firm*—IP Authority, LLC; Ramraj Soundararajan; Van Nguy

(57) ABSTRACT

A novel method is employed for collecting optimizer statistics for optimizing database queries by gathering feedback from the query execution engine about the observed cardinality of predicates and constructing and maintaining multidimensional histograms. This makes use of the correlation between data columns without employing an inefficient data scan. The maximum entropy principle is used to approximate the true data distribution by a histogram distribution that is as "simple" as possible while being consistent with the observed predicate cardinalities. Changes in the underlying data are readily adapted to, automatically detecting and eliminating inconsistent feedback information in an efficient manner. The size of the histogram is controlled by retaining only the most "important" feedback.

30 Claims, 7 Drawing Sheets

U.S. PATENT DOCUMENTS

| | | | |
|---|---|---|---|
| 7,336,826 B2 * | 2/2008 | Shin | 382/172 |
| 7,337,116 B2 * | 2/2008 | Charlesworth et al. | 704/254 |
| 7,340,376 B2 * | 3/2008 | Goodman | 702/181 |
| 7,355,580 B2 * | 4/2008 | Shen et al. | 345/98 |
| 7,366,564 B2 * | 4/2008 | Szu et al. | 600/473 |
| 7,376,639 B2 * | 5/2008 | Kutsch et al. | 707/2 |
| 7,382,453 B2 * | 6/2008 | Fisher et al. | 356/338 |
| 7,403,867 B2 * | 7/2008 | LeGore et al. | 702/181 |
| 7,406,653 B2 * | 7/2008 | Ide et al. | 714/799 |
| 7,426,496 B2 * | 9/2008 | Kristjansson | 706/10 |
| 7,433,532 B2 * | 10/2008 | Truitt et al. | 382/254 |
| 7,437,077 B2 * | 10/2008 | Wirth et al. | 398/119 |
| 7,441,429 B1 * | 10/2008 | Nucci et al. | 70/229 |
| 2002/0198896 A1 | 12/2002 | Chaudhuri et al. | |

OTHER PUBLICATIONS

Image enhancement method for underwater, ground and satellite images using brightness preserving histogram equalization with maximum entropy Singhai, J.; Rawat, P.; Conference on Computational Intelligence and Multimedia Applications, 2007. International Conference on vol. 3, Dec. 13-15, 2007 pp. 507-512.*

Large sample properties of maximum entropy histograms Rodriguez, C.; Ryzin, J.; Information Theory, IEEE Transactions on vol. 32, Issue 6, Nov. 1986 pp. 751-759.*

Thresholding using two-dimensional histogram and fuzzy entropy principle Cheng, H.D.; Chen, Y.H.; Jiang, X.H.; Image Processing, IEEE Transactions on vol. 9, Issue 4, Apr. 2000 pp. 732-735 Digital Object Identifier 10.1109/83.841949.*

Online adaptive histogram equalization Martinez, D.; Neural Networks for Signal Processing VIII, 1998. Proceedings of the 1998 IEEE Signal Processing Society Workshop Aug. 31-Sep. 2, 1998 pp. 531-538 Digital Object Identifier 10.1109/NNSP.1998.710684.*

An improved fast face recognition algorithm based on adjacent pixel intensity difference quantization histogram Fei-Fei Lee,; Koji Kotani,; Qiu Chen,; Tadahiro Ohmi,; Wavelet Analysis and Pattern Recognition, 2008. ICWAPR '08. International Conference on vol. 1, Aug. 30-31, 2008 pp. 316-320 Digital Object Identifier 10.1109/ICWAPR.2008.463.*

Thresholding based on fuzzy partition of 2D histogram Cheng, H.D.; Chen, Y.H.; Pattern Recognition, 1998. Proceedings. Fourteenth International Conference on vol. 2, Aug. 16-20, 1998 pp. 1616-1618 vol. 2 Digital Object Identifier 10.1109/ICPR.1998.712025.*

Aboulnaga et al. "Self-Tuning Histograms: Building Histograms Without Looking at Data" 1999 ACM SIGMOD Intl. Conf. on Management of Time, pp. 181-192, 1999.

Bruno et al. "STHoles: A Multidimensional Workload-Aware Histogram" 2001 ACM SIGMOD Intl. Conf. on Management Data, pp. 211-222, 2001.

Bruno, Nicolas "Automatic Management of Statistics on Query Expressions in Relational Databases" Thesis Proposal, Apr. 2002.

Chaudhuri et al. "Random Sampling for Histogram Construction: How much is enough?" 1998 ACM SIGMOD Intl. Conf. on Management of Data, 1998.

Chen et al. "Adaptive Selectivity Estimation Using Query Feedback" 1994 ACM SIGMOD Intl. Conf. on Management of Data, pp. 161-172, 1994.

Gunopulos et al. "Approximating Multi-Dimensional Aggregate Range Queries Over Real Attributes" 2000 ACM SIGMOD Intl. Conf. on Management of Data, pp. 463-474, 2000.

Lim et al. "SASH: A Self-Adaptive Histogram Set for Dynamically Changing Workloads" 2003 Intl. Conf. on Very Large Data Bases, pp. 369-380, Sep. 2003.

Poosala et al. "Selectivity Estimation Without the Attribute Value Independence Assumption" 1997 Intl. Conf. on Very Large Data Bases, Aug. 1997.

Selinger et al. "Access Path Selection in a Relational Database Management System" 1979 ACM SIGMOD Intl. Conf. on Management of Data, pp. 23-34, Jun. 1979.

* cited by examiner

CONSISTENT HISTOGRAM MAINTENANCE USING QUERY FEEDBACK

BACKGROUND OF THE INVENTION

1. Field of Invention

The present invention relates generally to the field of query optimization in database access. More specifically, the present invention is related to methods for query optimization using query feedback.

2. Discussion of Prior Art

Query optimization relies heavily on accurate cardinality estimates for predicates involving multiple attributes. In the presence of only unidimensional statistics, selectivity estimates are made by assuming independence (see "Access Path Selection in a Relational Database Management system", Selinger, P. et al., Proceedings of the ACM SIGMOD International Conference on Management of Data, pp 23-24, June 1979). However, this may lead to significant estimation errors, since database columns are often correlated (see "Selectivity Estimation Without the Attribute Value Independence Assumption", Poosala, V. & Ioannidis, Y., Proceedings of the International Conference on Very Large Data Bases, August 1997). Although multi-dimensional histograms have been proposed to address this problem, the traditional method of building these histograms through a data scan (henceforth called the proactive method) suffers from several disadvantages. Firstly, since it requires data access, contention for the database increases. Also, such a histogram needs to be periodically rebuilt in order to incorporate database updates, thus exacerbating the overhead of this method. Further, the proactive method does not scale well to large tables. With an increasing number of dimensions, exponentially more histogram buckets are needed to capture the data distribution with the same precision. When only a limited number of histogram buckets can be stored, it becomes important to allocate buckets by taking into account workload information, i.e. to allocate more buckets for the portion of data that is more frequently queried. However, the proactive method is purely data driven, and hence cannot exploit any workload information.

To overcome these problems, an alternative method of building histograms is known using query feedback (henceforth called the reactive method). See for example, "Self-Tuning Histograms: Building Histograms Without Looking at Data", Aboulnaga, A. & Chaudhuri, S., Proceedings of the ACM SIGMOD International Conference on Management of Data, pp181-192, 1999; "STHoles: A Multidimensional Workload-Aware Histogram", Bruno, N., Chaudhuri, S. and Gravano, L., Proceedings of the ACM SIGMOD International Conference on Management of Data, pp 211-212, 2001; "Adaptive Selectivity Estimation Using Query Feedback", Chen, C. & Roussopoulos, N., Proceedings of the ACM SIGMOD International Conference on Management of Data, pp161-172, 1994; "A Self-Adaptive Histogram Set for Dynamically Changing Workloads", Lim, L., Wang, M. & Vitter, J., Proceedings of the International Conference on Very Large Data Bases, pp 369-380, September 2003.

Consider a query having a predicate make='Honda', and suppose that the execution engine finds at runtime that 80 tuples from the Car table satisfy this predicate. Such a piece of information about the observed cardinality of a predicate is called a query feedback record (QF). As the DBMS executes queries, QFs can be collected with relatively little overhead and used to build and progressively refine a histogram over time. For example, the above QF may be used to refine a histogram on make by creating a bucket for 'Honda', and setting its count to 80.

The reactive approach remedies some problems with the proactive approach. Firstly, it reduces contention for the database, since it requires no database access. Moreover, a reactively built histogram requires no periodic rebuilding since updates are automatically incorporated by new QFs. A reactively built histogram can also be workload-aware, i.e., since more QFs are available for the portion of the data that is repeatedly being queried, the histogram can be made more accurate for this portion.

One possible disadvantage of a reactive approach is that it can only gather information for the portion of the data that has already been queried, as opposed to the proactive approach that gathers information about all data. However, this is not likely to be a serious problem in practice, due to the locality in query patterns (so that data not heavily queried in the past is not likely to be heavily queried in the future either). The pros and cons of a reactive approach versus a proactive approach are summarized in Table 1.

TABLE 1

| Proactive (by data scan) | Reactive (by query feedback) |
| --- | --- |
| Contends for database | Does not contend for database |
| Needs periodic rebuilding | No periodic rebuilding necessary |
| Not workload-aware | Workload-aware |
| Covers all data | Only covers queried data |

Previous proposals for histogram construction using query feedback have lacked either accuracy or efficiency. Some proposals, e.g., STGrid, use heuristics to refine the histogram based on a new QF, thereby leading to inaccuracies in the constructed histogram (see "Self-Tuning Histograms: Building Histograms Without Looking at Data", Aboulnaga, A. & Chaudhuri, S., Proceedings of the ACM SIGMOD International Conference on Management of Data, pp181-192, 1999). Other proposals, e.g., STHoles (referred to previously), require extremely detailed feedback from the query execution engine that can be very expensive to gather at runtime.

The reactive approach to histogram maintenance entails a number of interesting challenges:

1. Maintaining consistency: To ensure histogram accuracy, the histogram distribution must, at every time point, be consistent with all currently valid QFs and not incorporate any ad hoc assumptions; Previous proposals for feedback-driven histogram construction have lacked this crucial consistency property, even when the data is static. See for example STGrid or SASH.

2. Dealing with inconsistent QFs: In the presence of updates, deletes, and inserts, some of the QFs collected in the past may no longer be valid. Such old, invalid QFs must be efficiently identified and discarded, and their effect on the histogram must be undone.

3. Meeting a limited space budget: Database systems usually limit the size of a histogram to a few disk pages in order to ensure efficiency when the histogram is read at the time of query optimization. Thus, it is assumed that there is a limited space budget for histogram storage. In general, adding more QFs to the histogram while maintaining consistency leads to an increase in the histogram size. To keep the histogram size within the space budget, the relatively "important" QFs (those that refine parts of the histogram that are not refined by other QFs) must be identified and retained, and the less important QFs discarded.

Existing work on multidimensional statistics can be broadly classified as addressing either the problem of deciding which statistics to build or that of actually building them. This invention addresses only the latter problem. Many types of statistics have been proposed, e.g., histograms and wavelet-based synopses; of which only histograms are of interest here.

For building multidimensional histograms, proactive approaches that involve a data scan have been proposed, e.g., MHist (see "Selectivity Estimation Without the Attribute Value Independence Assumption", Poosala, V. & Ioannidis, Y., Proceedings of the International Conference on Very Large Data Bases, 1997), GenHist (see "Approximating Multi-Dimensional Agregate Range queries" Gunopoulos, D., Kollios, G. & Tsotras, V., SIGMOD, 2000), and others. As mentioned before, data scans may not effectively focus system resources on the user's workload and do not scale well to large tables. In principle, histograms can be constructed faster using a page-level sample of the data (see "Random Sampling for Histogram Construction: How Much is Enough?", Chaudhuri, S., Motwani, R. & Narasayya, V., Proceedings of the ACM SIGMOD International Conference on Management of Data, 1998), but large sample sizes—and correspondingly high sampling costs—can be required to achieve sufficient accuracy when data values are clustered on pages and/or highly skewed.

The idea of using query feedback to collect the statistics needed for estimating cardinality is known in the art. Early approaches relied on fitting a combination of model functions to the data distribution; with an ad hoc choice of functions that can lead to poor estimates when the data distribution is irregular. Another approach used query feedback only to compute adjustment factors to cardinality estimates for specific predicates, and not to build histograms. STGrid (referred to previously) and SASH (see "A Self-Adaptive Histogram Set for Dynamically Changing Workloads", Lim, L., Wang, M. & Vitter, J., Proceedings of the International Conference on Very Large Data Bases, pp 369-380, September 2003) both use query feedback to build histograms, but they often have low accuracy because their heuristic methods for adding new QFs to the histogram do not maintain consistency.

STHoles is another approach that uses query feedback to build histograms. The histogram structure of STHoles is considered to be superior to other bucketing schemes such as MHist, and for this reason is used in the present invention with some modifications. Unfortunately, the original STHoles maintenance algorithm requires, for each query and each histogram bucket, the computation of the number of rows in the intersection of the query and bucket regions. These detailed row counts, which are used to decide when and where to split and merge buckets, are usually not obtainable from the original query predicates alone. The query engine must therefore insert artificial predicates that specify the (possibly recursive) bucket boundaries. As the number of histograms and the number of buckets per histogram grows, the overhead of evaluating this "artificial feedback" becomes so high as to make the STHoles maintenance approach impractical. (The present invention, in contrast, needs only the actual feedback that naturally occurs during query execution—namely, the number of rows processed at each step during the query plan—which can be monitored with low overhead.) Finally, STHoles, unlike the present invention, does not provide principled methods for addressing issues of inconsistent feedback and limits on the available memory for storing the histogram.

The principle of maximum entropy is known, but has only been used for the significantly different problem of consistently estimating the selectivity of conjuncts of predicates such as $sel(p1\hat{\ }p2\hat{\ }p3\hat{\ }p4)$, given partial selectivities such as $sel(p1)$, $sel(p2\hat{\ }p3)$, $sel(p2\hat{\ }p3\hat{\ }p4)$, and so forth, i.e., the methods permitting the exploitation of existing multidimensional statistics (not necessarily from histograms), whereas the current invention is concerned with the collection of a specific type of statistic.

Whatever the precise merits, features, and advantages of the above cited references, none of them achieves or fulfills the purposes of the present invention.

SUMMARY OF THE INVENTION

The present invention relates to a solution for reactive multi-dimensional histogram construction and maintenance using query feedback, known as ISOMER (Improved Statistics and Optimization by Maximum-Entropy Refinement). In contrast to previous approaches, ISOMER is more accurate as well as more efficient.

ISOMER uses the principle of maximum entropy when adding new QFs to the histogram to approximate the true data distribution by the "simplest" distribution that is consistent with all of the currently valid QFs. ISOMER efficiently updates the maximum-entropy approximation in an incremental manner as new QFs arrive. In addition to maintaining consistency, the maximum-entropy principle also ensures that out of several possible histograms that are consistent with the added QFs, the choice of the final histogram is not arbitrary, but is in accordance with the traditional optimizer principle of uniformity. ISOMER employs linear programming (LP) to quickly detect and eliminate inconsistent QFs. An elegant feature of ISOMER is that the maximum-entropy solution automatically gives us an "importance" measure for each QF. Thus, to meet a limited space budget in ISOMER, QFs are simply eliminated in increasing order of this importance measure until the space budget is met. For reactive histogram maintenance, ISOMER is highly efficient, imposes very little overhead during query execution, and can provide much more accurate selectivity estimates than previous techniques while using only a modest amount of storage.

In a first aspect of the invention, the invention includes a database system and a method, apparatus and computer executable program for maintaining a histogram including a plurality of buckets, including gathering query feedback records from a query execution engine and adding new buckets to the histogram according to a principle of maximum entropy.

In a second aspect of the invention, the invention includes a database system and a method, apparatus and computer executable program for maintaining a histogram including a plurality of buckets, including limiting a total number of buckets to a predetermined budget, and eliminating query feedback records having lowest values of a measure of importance until said budget is met.

In a third aspect of the invention, the invention includes a database system and a method, apparatus and computer executable program for maintaining a histogram including a plurality of buckets, including eliminating query feedback records having lowest values of a measure of importance, where for an $i^{th}$ query the measure of importance is the absolute value of the natural logarithm of a Lagrange multiplier $\lambda_i$ as computed by solving the maximum entropy constraint optimization problem.

In a fourth aspect of the invention, the invention includes storing previous values of the Lagrange multiplier, solving the maximum entropy constraint optimization problem only for a region of said histogram corresponding to a new query feedback record and for regions of said histogram intersecting therewith, and computing a new value of the Lagrange multiplier for the new query feedback record.

In a fifth aspect of the invention, the invention includes caching values of bucket multipliers employed in each constraint of the maximum entropy constraint optimization problem, so that the bucket multipliers need not be computed each time the maximum entropy constraint optimization problem is solved.

In a sixth aspect of the invention, the invention includes removing by linear programming query feedback records that are inconsistent with existing query feedback records.

In a seventh aspect of the invention, the invention includes generating a series of slack variables corresponding to each query feedback record, setting each slack variable to be nonnegative, minimizing the sum of the slack variables and discarding query feedback records for which a corresponding slack variable is non-zero.

In an eighth aspect of the invention, the invention includes weighting each slack variable in the sum of slack variables in accordance with the age of a corresponding query feedback record.

In a ninth aspect of the invention, the invention includes merging a first bucket with a second bucket, the first bucket having the same referring set as the second bucket.

In a tenth aspect of the invention, the invention includes selecting the first bucket from a group consisting of a child bucket of the second bucket or a sibling bucket of the second bucket; where the child bucket of the second bucket is completely contained within the second bucket; and the second bucket and the sibling bucket of the second bucket are each completely contained within a common parent bucket.

In an eleventh aspect of the invention, the invention includes storing the query feedback records in an offline store, where the offline store is not read by the query execution engine.

DESCRIPTION OF THE PREFERRED EMBODIMENTS

Figure 1:
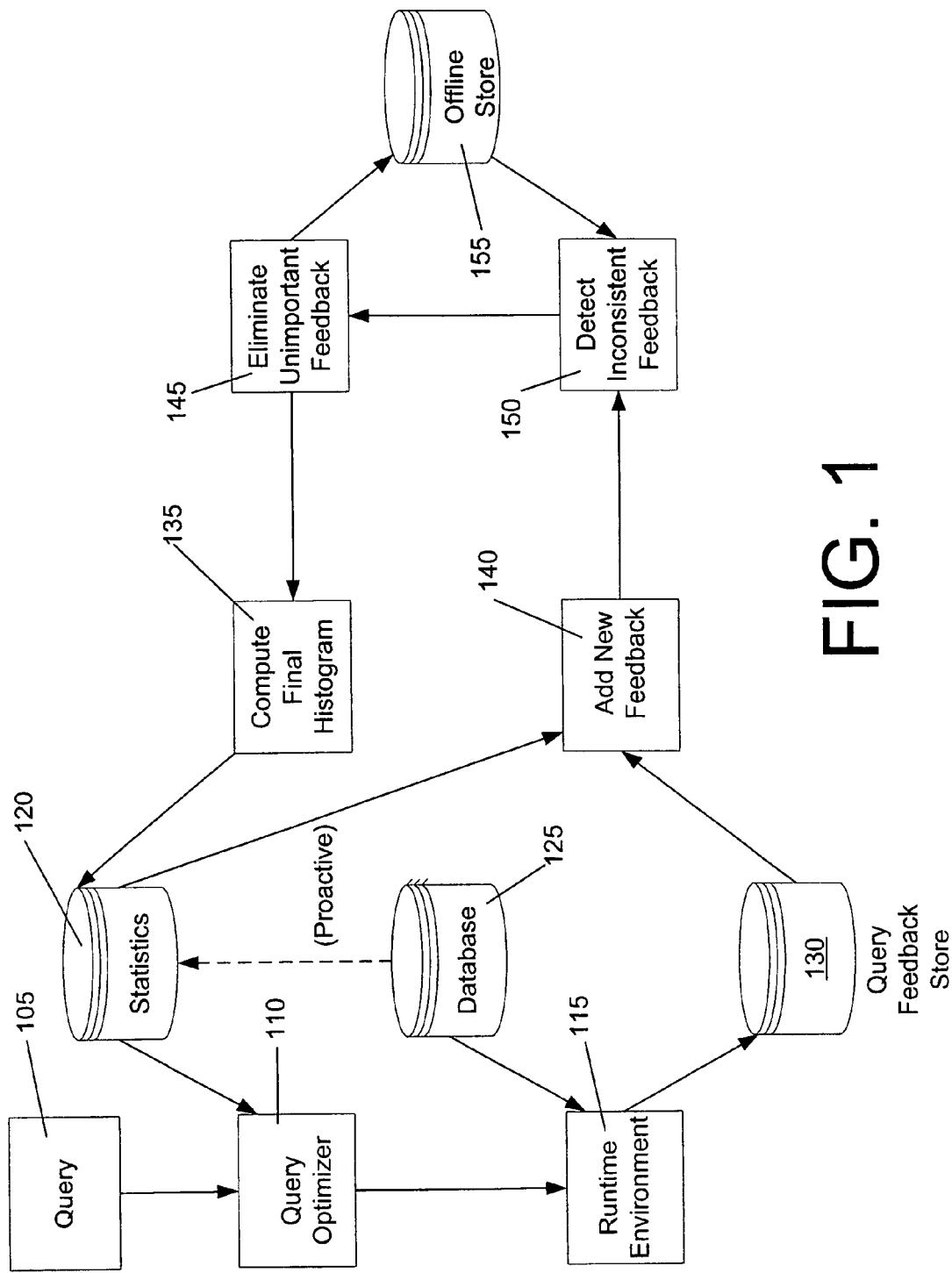
FIG. 1 illustrates the ISOMER architecture according to the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIG. 1 shows the architecture of ISOMER and where it would fit in a modem commercial DBMS. The left portion of the view shows a conventional DBMS. Here, a query 105 is first fed into a cost-based query optimizer 110, which produces a plan for the query based on maintained statistics 120.

Presently, all commercial systems apply the proactive approach for building statistics, which requires database access (as shown by the dotted arrow from database 125 to statistics 120). This plan is then executed on the database by the runtime environment 115. The applicants have tested ISOMER with a commercial DBMS (DB2 UDB), in which the runtime environment 115 would also gather actual selectivities of predicates at run time and dump them into a query feedback warehouse (see "Automated Statistics Collection in DB2 Stinger", Aboulnaga, A. et al., Proceedings of the International Conference on Very Large Databases, pp 1146-1157, September 2004). Due to efficiency concerns, a QF is not immediately used to refine the histogram as soon as it is obtained. Instead, the QFs are collected in a query feedback store 130 and used in batches to refine the histogram. In the architecture of the present invention, the database system 125 periodically invokes the ISOMER component, e.g. during periods of light load, or during a maintenance window.

The right hand side of FIG. 1 shows the various components of ISOMER. When ISOMER is invoked, it first reads off the currently maintained histogram at step 140. It then accesses the new QFs in the feedback warehouse 130 and adds them to the current histogram. This process mainly involves forming buckets corresponding to the new QFs, and is explained below.

As further discussed, it is important for the histogram to maintain consistency with previously added QFs. However, due to updates in the data the new QFs in the warehouse may be inconsistent with QFs added to the histogram earlier. In this case, there does not exist a histogram that is consistent with all QFs. Thus, before trying to find such a consistent histogram, ISOMER's first task is to detect in step 150 and then eliminate in step 145 old, inconsistent QFs. For this purpose, ISOMER needs a list of QFs previously added to the histogram. This is kept in an offline store 155 as depicted in FIG. 1. ISOMER reads the previous QFs from the offline store 155 and, along with a knowledge of the new QFs, uses linear programming to find inconsistent QFs. This process is further described in more detail below.

Note that the offline store 155 does not have to be read at query-optimization time and hence does not encroach on the space budget allowed for the histogram. In fact the query optimizer does not need to be aware of it. In any case, the size of the offline store 155 is not a concern since it cannot grow bigger than the size of the maintained histogram. Indeed, if there are more QFs than buckets, then some of these QFs will be either inconsistent or redundant and hence will be eliminated. Thus, the offline store 155 does not contribute to the size of the maintained statistics 120, which remain small.

Once ISOMER obtains a consistent set of QFs, the algorithm computes the histogram according to the maximum-entropy principle. This computation is described below. After adding all the QFs, the histogram may be too large to fit within the space budget allocated for it. ISOMER therefore selectively discards the relatively "unimportant" QFs in order to reduce the histogram size to the allocated budget. Intuitively, a particular QF is unimportant if the information provided by that QF (or an approximation thereof) is already provided by other QFs, i.e., if the QF refines a portion of the histogram that is already sufficiently refined by other QFs. The process for detecting and discarding unimportant QFs will be described later, in relation to FIG. 6.

Any inconsistent or unimportant QF that ISOMER discards is also removed from the list of QFs added to the histogram, and the revised list is written back to the offline store 155. In step 135 the final histogram is computed according to the maximum-entropy principle and written back into the database statistics 120.

After defining the notations that are used throughout, a running example is introduced, i.e. an example that will be used repeatedly throughout this application, that illustrates how query feedback can be used to build and refine a histogram, the importance of maintaining consistency, and the difficulties that arise therein. The use of the maximum-entropy principle to address these issues is then introduced, and its use in ISOMER explained.

Consider a table T with N tuples, a d-dimensional histogram over the attributes $A_1, \ldots, A_d$ of table T is desired to be built. If each attribute $A_i$ is numerical, let $l_i$ and $u_i$ be the minimum and maximum values of $A_i$ in the table. It is assumed that these values are available from one-dimensional database statistics on $A_i$. If attribute $A_i$ is categorical with $D_i$ distinct values it can still be treated as numerical by logically thinking of each distinct value as being mapped to a unique integer in $[1, D_i]$ ($l_i=1$ and $u_i=D_i$). An arbitrary mapping works because we assume that there can be only equality predicates (e.g. make='Honda') and no range predicates (e.g. make<='Honda') on a categorical attribute. The space in which the tuple values can lie is then given by $$S=[l_1,u_1] \times [l_2,u_2] \times \ldots \times [l_d,u_d].$$

Suppose query feedback is obtained for the m predicates $q_1, \ldots, q_m$. Each predicate $q_i$ is a conjunction of range (or equality) predicates on a subset of the attributes $A_1, \ldots, A_d$. Thus, $q_i$ is of the form:

$$a_1 \leq A_i^1 \leq b_1 \wedge \ldots \wedge a_{d'} \leq A_i^{d'} \leq b_{d'}$$

where $A_i^1, \ldots, A_i^{d'}$ ($d' \leq d$) are distinct attributes from among $A_1, \ldots, A_d$. Assume that there are only equality predicates on categorical attributes, i.e. if $A_i^j$ is categorical, $a_j=b_j$. Let $R(q_i)$ denote the subset of the region S for which $q_i$ is true. For each $q_i$ the query feedback record (QF) consists of the number of tuples that actually satisfy $q_i$, denoted by $N(q_i)$.

A multi-dimensional histogram seeks to capture the distribution of tuples in S by dividing S into $k \geq 1$ mutually disjoint buckets, and recording the number of tuples in T that fall in each bucket. Histograms that might have arbitrary overlap between buckets are not considered, as the maintenance of such histograms is typically very expensive. ISOMER actually maintains an approximate histogram that records an estimate of the number of tuples that fall in each bucket. Let $b_1, b_2, \ldots, b_k$ denote the k histogram buckets. Each bucket $b_i$ covers a certain portion of S that is denoted by $C(b_i)$. For each bucket $b_i$ a count of the number of tuples in $C(b_i)$ is denoted by $n(b_i)$. Within each bucket $b_i$, the tuples are assumed to be uniformly distributed throughout $C(b_i)$.

Consider a simple Car relation having the following schema:

Car: (make, color)

Suppose that a user executes the following query on this relation:

SELECT*FROM Car WHERE make='Honda' AND color='White'

Figure 2:
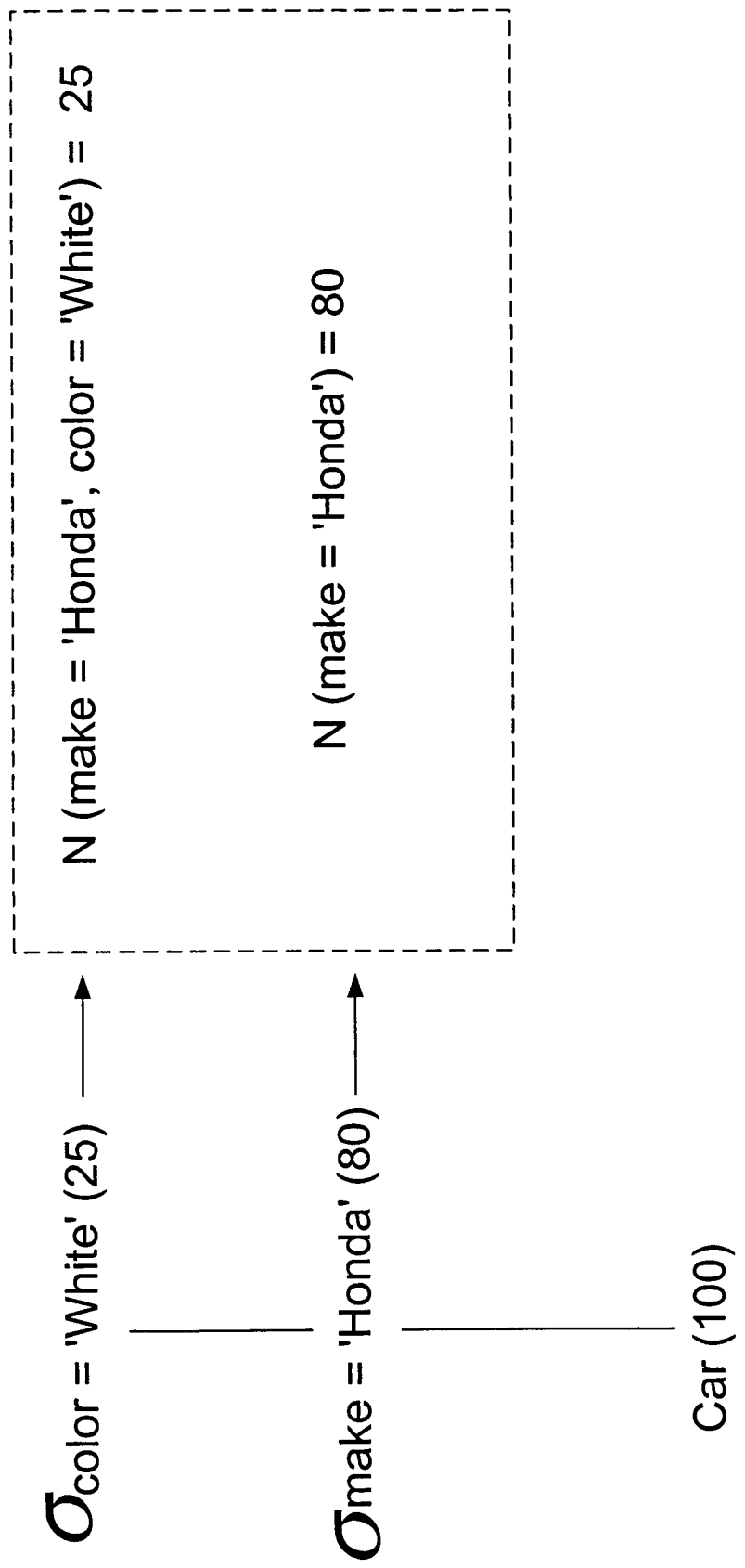
FIG. 2 illustrates gathering query feedback records (QFs) according to the present invention.

FIG. 2 shows a possible query plan for executing this query (the actual number of tuples at each stage are shown in parenthesis). FIG. 2 also shows the various predicates q for which N(q) can be collected during query execution. This selectivity information for predicates in executed queries comprises QFs (query feedback records). Gathering of QFs is already supported by certain commercial database systems and has been shown to have very low runtime overhead (typically <5%, see "LEO-DB2's Learning Optimizer", Stillger, M., Lohman, G., Markl, V. & Kandil, M., Proceedings of the International Conference on Very Large Databases, pp 19-28, September 2000).

Figure 3:
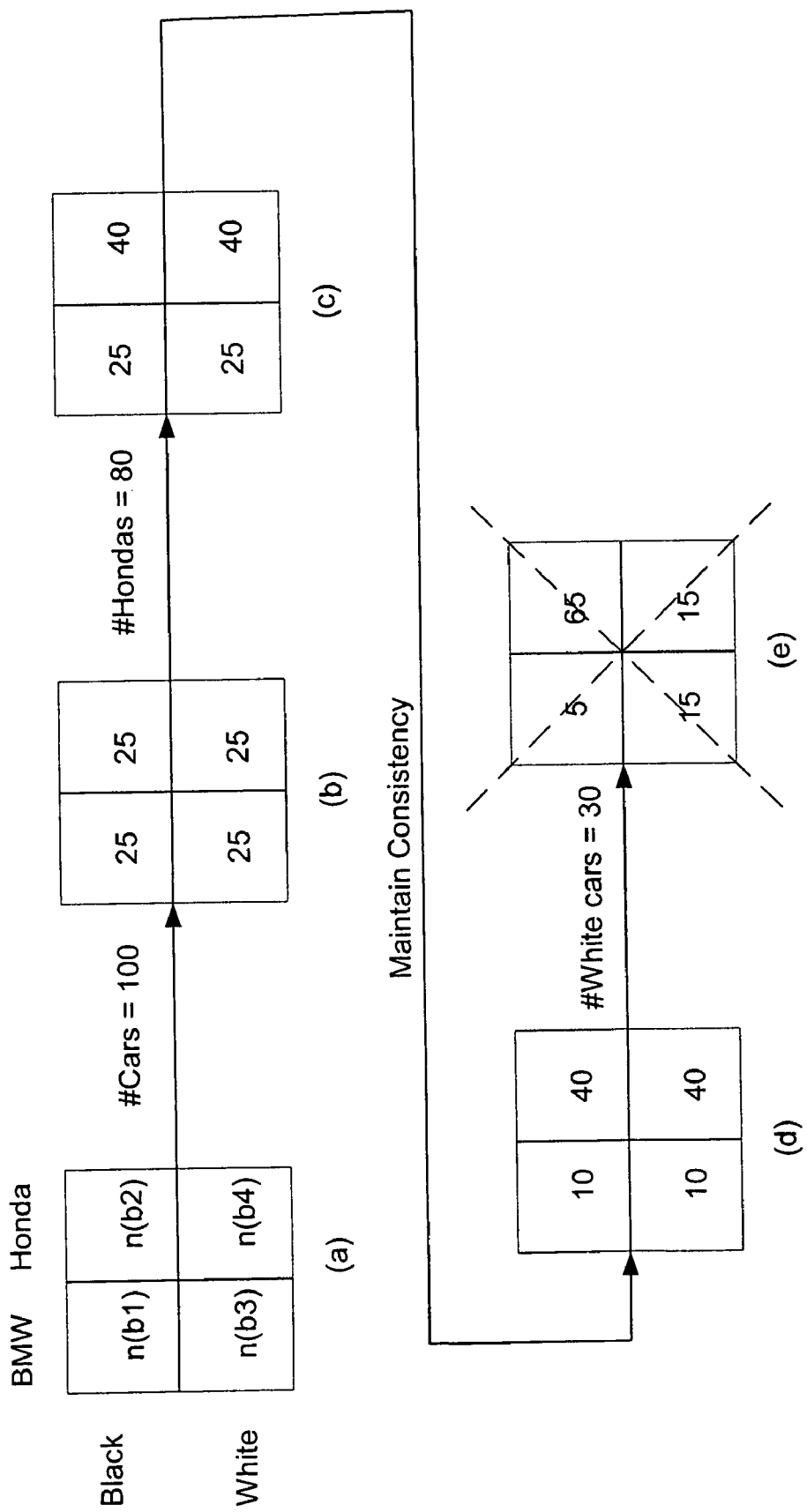
FIG. 3 illustrates a running example according to the present invention.
Figure 7:
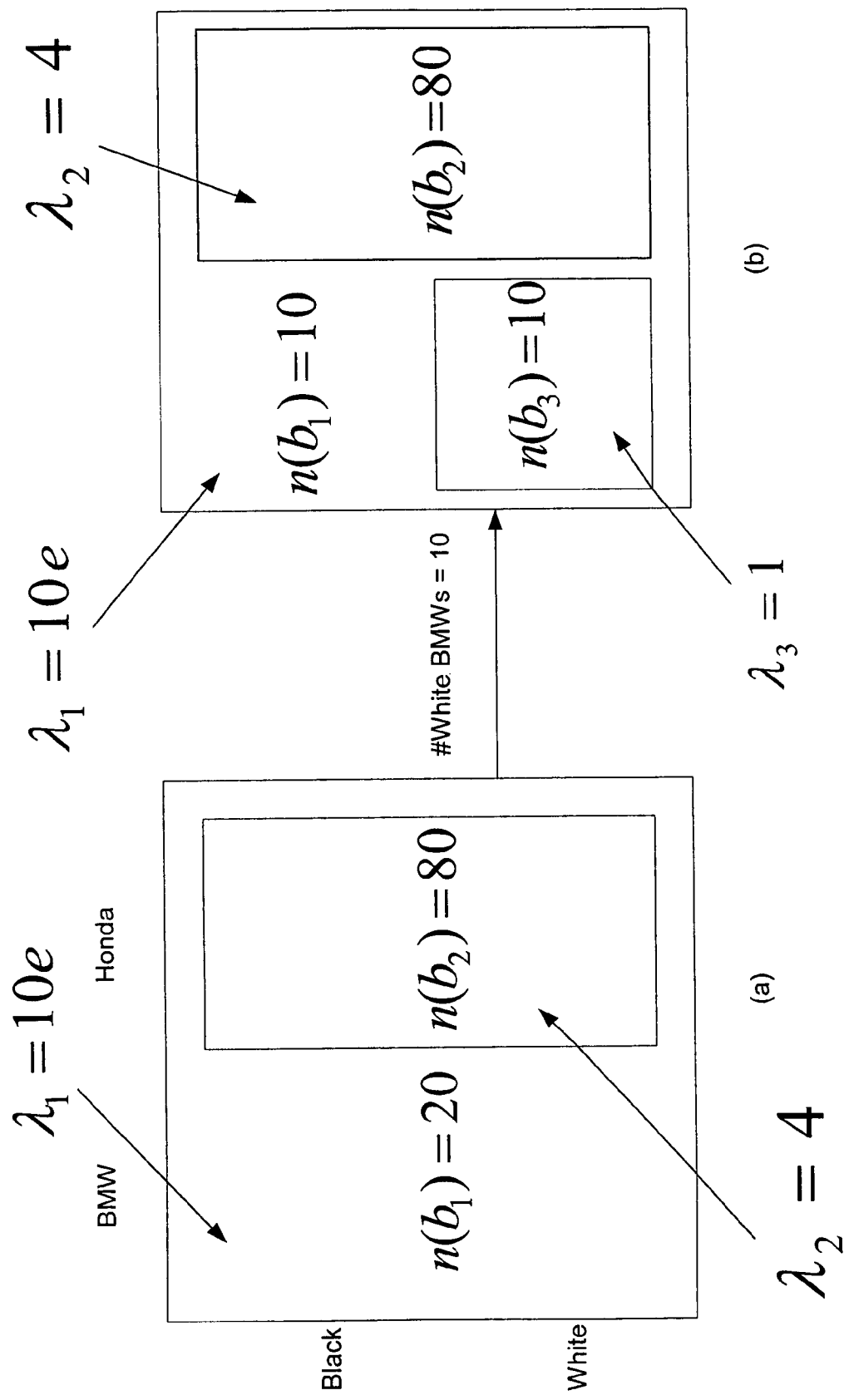
FIG. 7 illustrates a QF Example according to the present invention.

Now turning to FIG. 3, suppose that it is desired to build a two-dimensional histogram on the attributes make and color by using query feedback. (Please note that each step from (a) to (e) in FIG. 3 is referred to for convenience as a separate figure, e.g. 3(a), etc., and that this practice will also be followed with respect to FIG. 7.) Also suppose for simplicity that there are only two distinct makes (say 'Honda' and 'BMW'), and only two distinct colors (say 'Black' and 'White') in the Car table. Then any multi-dimensional histogram on these attributes can only have a maximum of four buckets (see FIG. 3(a)). It is assumed that the histogram stores all of these four buckets.

The first QF that is added to the histogram is the total number of tuples in the table. This number can be obtained from the table statistics. Suppose there are 100 tuples in the Car table (N=100). This QF can be expressed as the following constraint:

$$n(b_1)+n(b_2)+n(b_3)+n(b_4)=100 \quad (1)$$

At this point, there are various possible assignments of values to the $n(b_i)$'s that will make the histogram consistent with this single QF. In the absence of any additional knowledge, the traditional optimizer assumption of uniformity distribution of values is assumed. Hence, the histogram obtained after adding this QF is one in which each $n(b_i)$ equals 25, as shown in FIG. 3(b). The next step is to add the QF N(make='Honda')=80 to the histogram. Again, this QF can be expressed as the constraint:

$$n(b_2)+n(b_4)=80 \quad (2)$$

To make the histogram consistent with the QF of equation (2), and assuming uniformity between n(b2) and n(b4), set n(b2)=n(b4)=40. The resulting histogram is shown in FIG. 3(c). At this point, the STGrid approach would consider the process of adding this QF to be finished, with FIG. 3(c) as the final histogram (see "Self-Tuning Histograms: Building Histograms Without Looking at Data", Aboulnaga, A. & Chaudhuri, S., Proceedings of the ACM SIGMOD International Conference on Management of Data, pp181-192, 1999).

Notice, however, that the histogram in FIG. 3(c) is no longer consistent with the first QF of equation (1). Equations (1) and (2) together imply that $n(b_1)+n(b_3)=20$. Thus, making the histogram consistent with this equation, and assuming uniformity between $n(b_1)$ and $n(b_3)$, set $n(b_1)=n(b_3)=10$. The final consistent histogram is shown in FIG. 3(d).

Notice that even by adding information only about Hondas, the histogram now gives a more accurate estimate of the frequency of BMWs. This improvement is a direct result of the previous step in which consistency was maintained while adding new QFs. Also note that the computational complexity of adding a QF to the histogram is independent of the size of the database table. Even if the Cars table had a million tuples instead of 100, the analysis would remain unaffected. This shows that the reactive approach to histogram maintenance is highly scalable.

In summary, there are two requirements to be met when adding a new QF to the histogram:

1. Consistency: On adding a new QF, the histogram should be consistent with all QFs added so far.
2. Uniformity: In case there are multiple histograms consistent with all of added QFs, then the choice of the final histogram should not be arbitrary, but must be based on the traditional assumption of uniformity.

So far in this example, it has been easy and intuitive to apply the uniformity assumption. However, in the presence of partially overlapping constraints, it is not always clear how to impose uniformity. To illustrate, suppose that the next QF added to the histogram is N(color='white')=30 (possibly obtained from another query). This QF can be written as the constraint:

$$n(b_3)+n(b_4)=30. \quad (3)$$

If the naïve solution is employed of making the histogram consistent with equation (3) while using the uniformity assumption on $n(b_3)$ and $n(b_4)$, then $n(b_3)=n(b_4)=15$. Further, on maintaining consistency with equations (1) and (2), the final histogram shown in FIG. 3(e) is obtained. However, this solution clearly is not consistent with the uniformity assumption: although white Hondas and white BMWs are in equal proportion, there are far more black Hondas than black BMWs. This non-uniformity across colors has not been indicated by any added QF, but has been introduced due to our ad-hoc method of enforcing consistency.

STHoles (see "Random Sampling for Histogram Construction: How Much is Enough?", Chaudhuri, S., Motwani, R. & Narasayya, V., Proceedings of the ACM SIGMOD International Conference on Management of Data, 1998) does not face this problem because it assumes that a QF for a predicate $q_i$ explicitly includes a count of the number of tuples in the intersection of $R(q_i)$ with every existing histogram bucket. Thus, STHoles would assume that $n(b_3)$ and $n(b_4)$ were separately known. However, gathering such detailed QFs is expensive, making it a high-overhead approach in general.

Thus, with the limited feedback available, to maintain true uniformity in the histogram, a formal definition and measure of uniformity is needed. The present invention employs the information-theoretic principle of maximum entropy, described next.

Consider a discrete probability distribution $D=(p_1, p_2, \ldots, p_n)$ over n mutually exclusive and exhaustive events $E_1, E_2, \ldots, E_n$, i.e., where $P_r(E_i)=p_i$ for $i=1, \ldots, n$, each $p_i$ is nonnegative and $$\sum_{i=1}^{n} p_i = 1.$$

In many applications, only partial information about such a probability distribution is available (e.g., $p_1+p_2=0.5$) such that multiple distributions may be consistent with the available information. However, it is still necessary to determine a unique probability distribution to work with that is consistent with all available information. The maximum-entropy principle provides a well grounded criterion for selecting such a unique distribution.

The entropy H(D) of the distribution D is given by:

$$H(D) = -\sum_{i=1}^{n} p_i \ln(p_i). \quad (4)$$

The maximum-entropy principle states that the unique probability distribution that should be chosen is the one that is consistent with all of the information about the distribution and that has the maximum entropy from among the multiple consistent distributions. An intuitive justification for the maximum-entropy principle is as follows. It is well known in information theory that entropy measures the uncertainty or uninformativeness in a distribution. For example, the value of the entropy ranges from 0 when a specified outcome occurs with certainty to a maximum of ln(n) when no information is available and all outcomes are equally likely ($p_i=1/n$). Thus, by choosing to use the distribution with the maximum-entropy principle that is still consistent with the available information, the most uninformative distribution possible is chosen. To choose a distribution with lower entropy would amount to assuming information that is not possessed; to choose one with a higher entropy would ignore the information that is possessed. Thus, the maximum-entropy distribution is the only reasonable choice. A more formal justification of the principle can be found in "Axiomatic Derivation of the Principle of Maximum Entropy and the Principle of Minimum Cross-Entropy", Shore, J. & Johnson, R., IEEE Transactions on Information Theory, Volume 26, No. 1, pp 26-37, January 1980. For a continuous probability distribution with probability density function (pdf) D(u), the entropy is defined as $$H(D) = \int_{S}$$

D(u) ln(D(u))du, and the foregoing discussion extends to this setting.

For the purposes of ISOMER, the maximum-entropy principle can also be justified as a means of ensuring uniformity. As can be verified, entropy is maximized for a uniform distribution. Thus, choosing the distribution according to the maximum-entropy principle facilitates the goal of maintaining consistency and uniformity at the same time. The maximum entropy principle has been used in a variety of fields, notably natural language processing, see for example "A Maximum Entropy Approach to Natural Language Processing", Adam, B., Pietra, S. & Pietra, V., Computational Linguistics, Volume 22, No. 1, pp 39-71, 1996.

The histogram structure used in ISOMER is described next. Then it is shown how application of the maximum-entropy principle leads to an optimization problem and how this optimization problem is solved in ISOMER is described.

ISOMER can make use of any histogram data structure, the STHoles data structure being used in a preferred embodiment (see "A Multidimensional Workload-Aware Histogram", Bruno, N., Chaudhuri, S. & Gravano, L., Proceedings of the ACM SIGMOD International Conference on Management of Data, pp 211-212, 2001) to represent and store multidimensional histograms, due to its demonstrated superiority over other histogram structures such as MHist (see "Selectivity Estimation Without the Attribute Value Independence Assumption", Poosala, V. & Ioannidis, Y., Proceedings of the International Conference on Very Large Data Bases, August 1997). In the STHoles histogram, each bucket $b_i$ has a hyper-rectangular bounding box denoted by box ($b_i$) ($\subseteq$ S), i.e., bucket $b_i$ is bounded between two constant values in each dimension. However, bucket $b_i$ does not cover the entire region box ($b_i$). There may be some "holes" inside box ($b_i$) that are not covered by $b_i$. These regions are themselves histogram buckets, and are referred to as children of $b_i$. The bounding boxes of these children are mutually disjoint hyper-rectangles and completely enclosed within box ($b_i$). The region covered by $b_i$ is formally given by:

$$C(b_i) = \text{box}(b_i) - \bigcup_{b_j \in \text{children}(b_i)} \text{box}(b_j)$$

Note that by this definition, for any two distinct buckets $b_i$ and $b_j$, $C(b_i)$ and $C(b_j)$ are disjoint.

Figure 4:
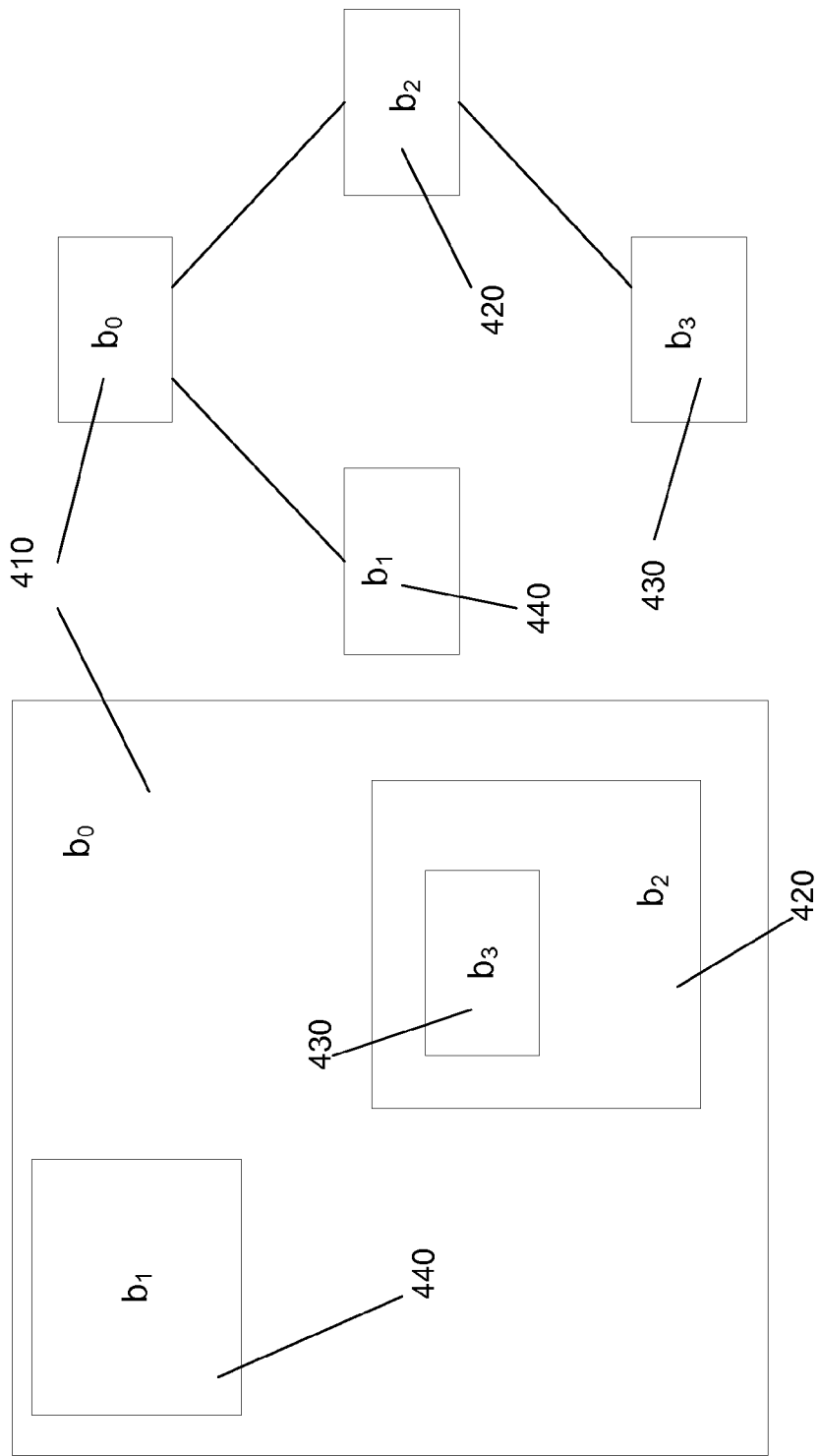
FIG. 4 illustrates the STHoles histogram structure.

Intuitively, in the absence of holes, $b_i$ would represent a region of uniform tuple density. However, the histogram identifies regions within $b_i$ that have a different tuple density, and represents them as separate histogram buckets. A histogram can also be represented as a tree structure. FIG. 4 shows an example two-dimensional histogram with the corresponding tree representation. A bucket b0 410 is shown containing buckets $b_1$ 440 and $b_2$ 420, as well as $b_3$ 430, which is a child of b2 420, and to the right of these is shown a tree diagram, where the same buckets are represented by the same reference numerals.

Now consider the querying of such a histogram structure. Consider a hyperrectangular region R bounded between $l_j$ and $u_j$ in the $j^{th}$ dimension. Its volume is given by Vol $$(R) = \prod_{j=1}^{d} (u_j - l_j).$$

Consider a multidimensional predicate q that selects all tuples lying in the region $R(q) \subseteq S$. The histogram comprising buckets $b_1, b_2, \ldots, b_k$ estimates the number of tuples that satisfy this predicate as:

$$\hat{N}(q) = \sum_{i=1}^{n} n(b_i)(\text{vol}(R(q) \cap C(b_i)))/(\text{vol}(C(b_i)))$$

Here vol(R) denotes the usual euclidean volume of the region R when the data is real-valued; for discrete (i.e., integer or integer-coded categorical) data, vol(R) denotes the number of integer points that lie in R.

In ISOMER the histogram is initialized to contain a single bucket $b_1$ such that box $(b_1) = C(b_1) = S$ and $n(b_1) = N$. At this point, the histogram is merely equivalent to assuming uniformity. As more QFs are added over time, ISOMER learns more about the distribution of tuples in S and incorporates this information into the histogram by adding holes in $b_1$.

ISOMER's technique for adding holes is slightly different and simpler than the method used in STHoles. Suppose that ISOMER obtains a QF about a specified multidimensional predicate q. To make the histogram consistent with this QF, ISOMER must first ensure that the histogram contains a set of buckets that exactly cover R(q), so that the sum of the tuple counts in these buckets can then be equated to N(q) as above. If such a set of buckets already exists, no holes need to be added. Otherwise, the process of adding holes for q proceeds as shown in FIG. 5.

ISOMER descends down the bucket tree until it finds a bucket b such that $R(q) \subset C(b)$ but $R(q) \not\subseteq C(b')$ for any b'∈children (b). ISOMER forms a new bucket $b_{new}$ such that box$(b_{new})$=R(q) and processes each bucket b'∈children (b) as follows. If box(b') ⊂ R(q), then b' is removed from children(b) and added to children($b_{new}$). If box(b')∩R(q)=0, then nothing needs to be done. If box(b') partially overlaps R(q), then bucket b' (and recursively its children), are split as shown in FIG. 5 to preserve disjointness and a hyperrectangular shape. The parent child relationships are changed appropriately.

Figure 5:
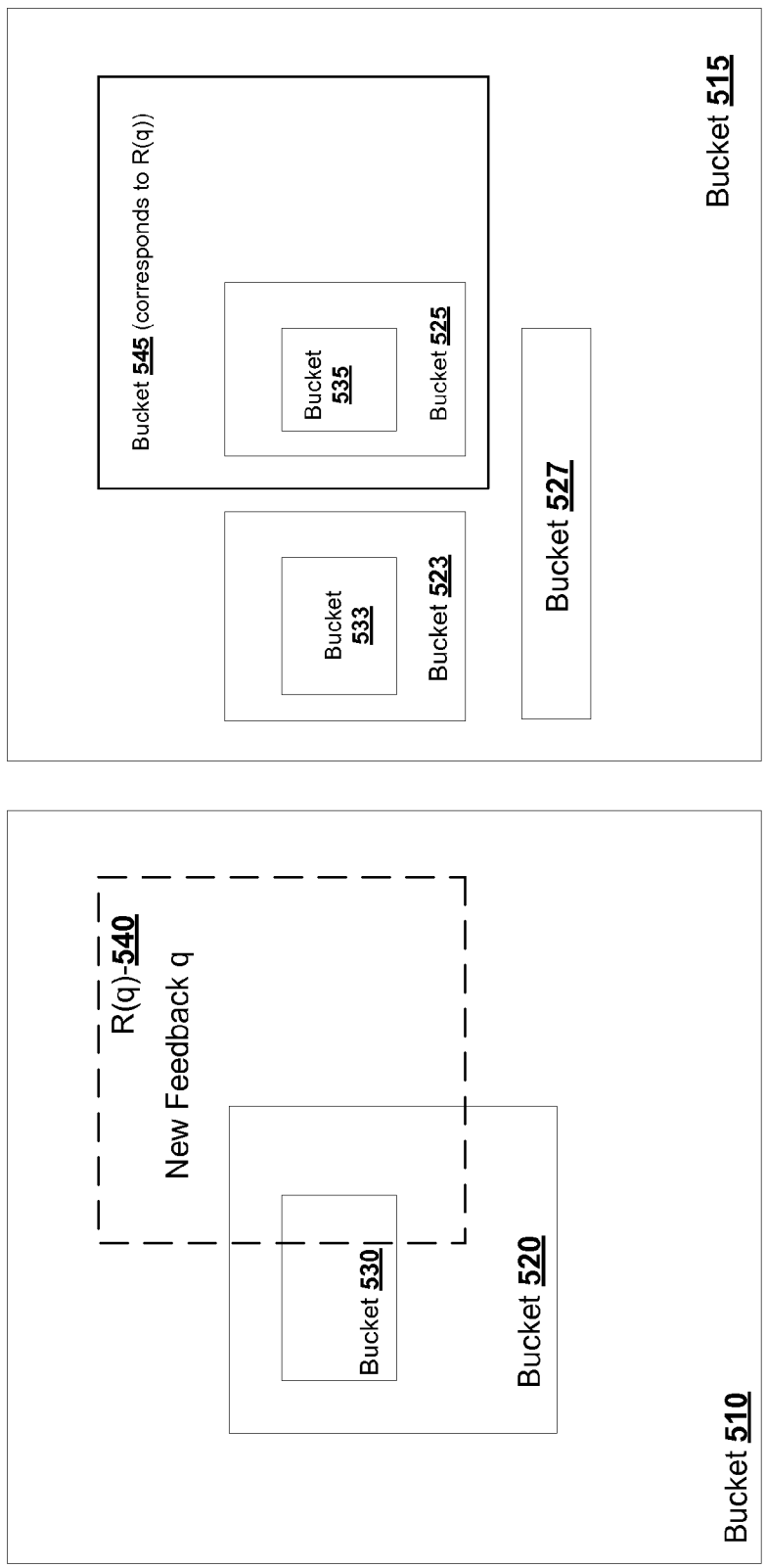
FIG. 5 illustrates adding holes for a new QF according to the present invention.

Specifically, in the example of FIG. 5, 510 shows bucket 520 and its child 530, as well as showing R(q) at 540. The addition of a bucket 545 corresponding to R(q) causes 520 to be divided into 523, 525 and 527, as well as dividing child 530 into 533 and 535, as shown at 515. This maintains each bucket and each child in hyperrectangular form.

To apply the maximum-entropy principle in ISOMER, a probability distribution D, and hence an entropy value H(D), is associated with every possible histogram. In accordance with the maximum-entropy principle, ISOMER then maximizes H(D) over the set of all histograms that are consistent with the current set of QFs. To define D and H(D), consider an histogram with buckets $b_1, \ldots, b_k$ having bucket counts $n(b_1), \ldots, n(b_k)$. If the data is discrete, then D is a probability distribution over the integer points of S given by $p_u = n(b*u)/[NV(b*u)]$ for u∈S, where b*u is the unique bucket b such that u∈C(b) and V(b)=vol(C(b)). This definition follows from equation (4) after dividing both sides by the total number of tuples N and taking q to be the point query "($A_1, A_2, \ldots, A_d)=u$". The entropy $H(D) = -\Sigma_{u \in S} p_u \ln(p_u)$ corresponding to the distribution D is thus given by $$H(D) = -\sum_{u \in S} (n(b_u^*))/(NV(b_u^*)) \ln(n(b_u^*))/(NV(b_u^*))$$

$$= -\sum_{i=1}^{k} \sum_{u|u \in C(b_i)} (n(b_i))/(NV(b_i)) \ln(n(b_i))/(NV(b_i))$$

Since the inner sum comprises $V(b_i)$ identical terms that are independent of u, $$H(D) = -\sum_{i=1}^{k} (n(b_i))/(N) \ln((n(b_i))/(NV(b_i))) \quad (5)$$

$$= -(1/N) \sum_{i=1}^{k} n(b_i) \ln((n(b_i))/(V(b_i))) + \ln N$$

where the last equality uses the identity $\Sigma_{i=1}^{k} n(bi) = N$. For real-valued data, D is taken to be the pdf defined by D(u)=pu for each real-valued point u∈S, where $p_u$ is defined as above; note that this density function is constant within each region C(bi). A straightforward calculation shows that the entropy $H(D) = \int_S D(u) \ln(D(u)) du$ is given by equation (5).

We now express the QFs as constraints on the histogram. Suppose that ISOMER has obtained QFs for m predicates $q_1, \ldots, q_m$. First, ISOMER adds holes for these QFs in the histogram as described above. For each $q_i$, the procedure ensures that the set of histogram buckets lying within $R(q_i)$ exactly cover $R(q_i)$. Hence the QF for $q_i$ can be written as the constraint $$\sum_{b | C(b) \subseteq R(q_i)} n(b) - N(q_i) \quad (6)$$

The application of the maximum-entropy principle thus leads to a well posed optimization problem: for a histogram with buckets $b_1, \ldots, b_k$, select nonnegative bucket counts $n(b_1), \ldots, n(b_k)$ so as to maximize the expression H(D) in equation (5), while satisfying equation (6) for $1 \leq i \leq m$.

To solve the above optimization problem, associate a Lagrange multiplier $y_i (1 \leq i \leq m)$ with the ith constraint given by equation (6). After removing the constants from the objective function in equation (5), the Lagrangian of the optimization problem is given by:

$$\sum_{i=1}^{m} y_i \left( \sum_{b|C(b) \subseteq R(q_i)} n(b) - N(q_i) \right) - \sum_{i=1}^{k} n(b_i) \ln(n(b_i)/V(b_i))$$

Differentiating the above expression with respect to n(b) and equating to 0 to get $$\sum_{i|C(b) \subseteq R(q_i)} y_i - \ln(n(b)/V(b)) - 1 = 0,$$

so that, setting $\lambda_i = e^{y_i}$, $$n(b) = (V(b)/e) \prod_{i|C(b) \subseteq R(q_i)} y_i. \qquad (7)$$

Equation (7) implies that the maximum entropy solution is of the following form. Associate a multiplier with each QF. Then, the number of tuples in each bucket is proportional to the product of the multipliers corresponding to those QFs which that bucket is part of. Now, only the multipliers $\lambda_1, \ldots, \lambda_m$ are variables remaining to be determined. The expression for n(b) from equation (7) can be plugged back into the constraints given by equation (5) to obtain:

$$For\ i = 1, \ldots, m \sum_{i|C(b) \subseteq R(q_i)} (V(b))/e \prod_{j|C(b) \subseteq R(q_j)} \lambda_j = N(q_i) \qquad (8)$$

$$\lambda_i = (N(q_i) \cdot e) \Bigg/ \left( \sum_{i|C(b) \subseteq R(q_i)} V(b) \prod_{j|C(b) \subseteq R(q_j)} \lambda_j \right)$$

Equation (8) is referred to as the iterative scaling equation. Any convenient initial value for the $\lambda_i$'s can be used (e.g. each $\lambda_i = 1$), and then equation (8) can be used to iteratively update the value of each $\lambda_1$ in turn until convergence.

EXAMPLE 1

Figure 6:
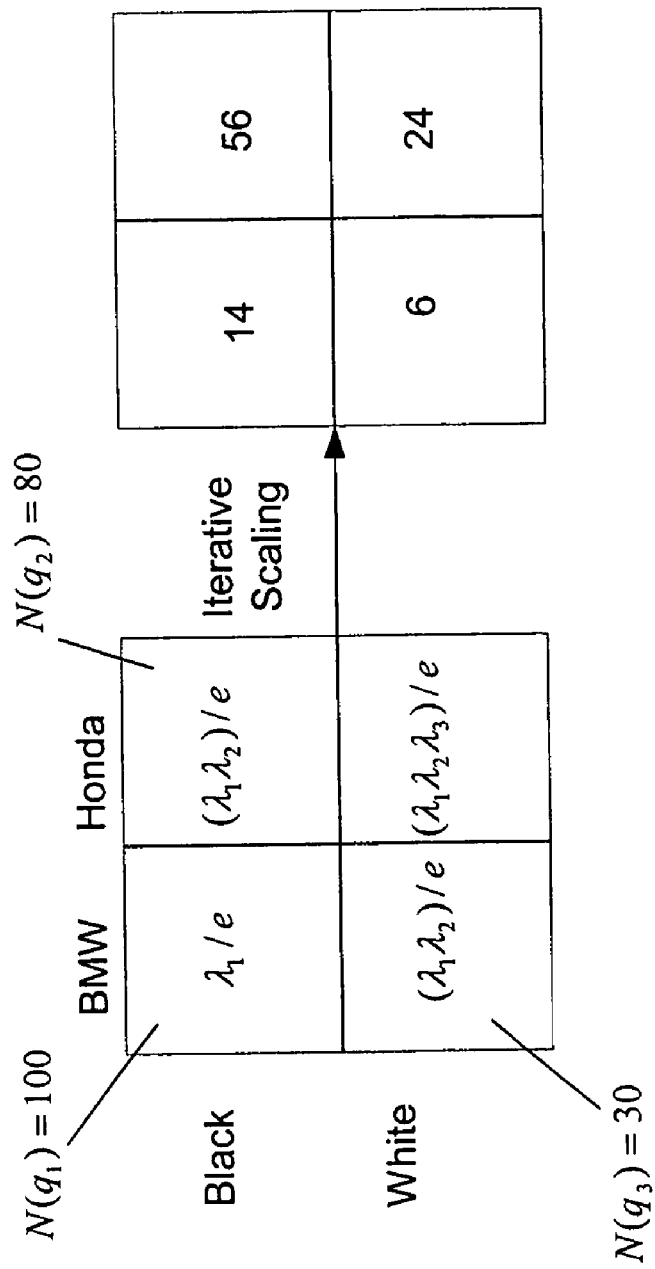
FIG. 6 illustrates an iterative scaling example according to the present invention.

For the running example, $V(b_i) = 1$ for each i. As before, three QFs are added, given by equations (1), (2), and (3). Denote these QFs as $q_1$, $q_2$, and $q_3$, respectively; see FIG. 5. Since bucket $b_1$ is referred to only by $q_1$, it follows from equation (7) that $n(b_1) = \lambda_1/e$. Similarly, $n(b_2) = \lambda_1 \lambda_2/e$, $n(b_3) = \lambda_1 \lambda_3/e$, and $n(b_4) = \lambda_1 \lambda_2 \lambda_3/e$. Equations (1), (2), and (3) can therefore be rewritten as $\lambda_1 + \lambda_1 \lambda_2 + \lambda_1 \lambda_3 + \lambda_1 \lambda_2 \lambda_3 = 100e$ $\lambda_1 \lambda_2 + \lambda_1 \lambda_2 \lambda_3 = 80e$ $\lambda_1 \lambda_3 + \lambda_1 \lambda_2 \lambda_3 = 30e$ Solving the above equations, $\lambda_1 = 14e$, $\lambda_2 = 4$, and $\lambda_3 = 3/7$ are obtained, yielding the final histogram (FIG. 6).

This histogram is consistent with all of the added QFs. It is also the most uniform in the following sense. It maintains the 80-20 ratio between Hondas and BMWs for both the colors. Similarly, it maintains the 30-70 ratio between white and black cars for both the makes. Such uniformity is not obtained by adding QFs in an ad-hoc manner, e.g., as in the histogram of FIG. 3(e).

Two techniques have been used here to speed up the implementation of iterative scaling in the present invention over a naive implementation:

Incremental computation: When a new QF is added, the new maximum entropy solution can be incrementally computed using the previous solution rather than from scratch. To enable incremental computation, the multipliers corresponding to each QF are persisted in the offline store 155. When the next QF (for predicate $q_{m+1}$) is added, the old values of $\lambda_1, \ldots, \lambda_m$ and $\lambda_{m+1} = 1$ are used as a starting point for the iterative scaling. In this way, the solution needs to be recomputed only for $R(q_{m+1})$ and the regions covered by the QFs that intersect with $q_{m+1}$. For the rest of the histogram space S, the previous solution is reused. Similarly, when a constraint is eliminated the new solution can be computed incrementally. The old values of the multipliers are used as the starting point for the iterative scaling, leading to similar savings in computation.

Caching of products: For each bucket b, the precomputed product $$\prod_{j|C(b) \subseteq R(q_j)} \lambda_i$$

is retained. This product is referred to as the bucket multiplier corresponding to bucket b. With bucket multipliers available, it is not necessary to repeatedly compute the product in the denominator on the right-hand side of equation (8). When a particular $\lambda_1$ is updated according to equation (8), the multipliers are updated corresponding to all buckets b such that $C(b) \subseteq R(q_i)$. Note that it is necessary anyway to iterate through all such buckets in order to compute the summation in the denominator of the right-hand side of equation (8). Thus, bucket multipliers can be maintained at low cost and lead to substantial savings in computation.

As long as no tuples are updated, inserted, or deleted, all of the QFs obtained by ISOMER are consistent with each other, and there exists at least one valid histogram solution that satisfies the set of constraints in equation (5). However, in the presence of data changes, the set of QFs might evolve to a point at which no histogram can be simultaneously consistent with the entire set.

EXAMPLE 2

Suppose that ISOMER obtains the two QFs N(make='Honda')=80 and N(make='Honda', color='White')=30, and then some updates to the data occur. After these updates, ISOMER might obtain the QF N(make='Honda', color='Black')=60. Clearly, there exists no histogram solution consistent with all three QFs.

EXAMPLE 3

Suppose that ISOMER obtains the QF N(make='Honda')= 80. Then some new car tuples are inserted. After these updates, the QF N(make='Honda', color='Black')=90 might be obtained. Any solution that is consistent with both the above QFs shall have n(b)<0 for at least one bucket b. Hence these solutions shall not be valid as histograms.

In the presence of such inconsistent QFs, if we invoke the maximum entropy solution, the variable values will never converge, since there exists no consistent solution to the optimization problem. Thus, ISOMER must first eliminate the QFs that are no longer valid due to updates, leaving a set of consistent QFs having a valid histogram solution. Thus, in Example 3, the first QF about the total number of Honda cars being 80 must be eliminated because it cannot be true given the newer information of there being 90 black Honda cars.

However, deciding which QF is invalid is not always straightforward and depends on the type of data change. In Example 2, if some new black-Honda tuples have been inserted, the first QF is invalid. However, if the color of some Hondas has been updated from white to black, then the second QF is invalid. In general, both the first and second QFs may be invalid.

Since no information is available about the type of data change, ISOMER uses the notion of the age of a QF to decide which QFs to discard. The intuition is that the older a QF, the more likely that it has been invalidated. Thus ISOMER discards those QFs that are relatively old and whose removal leaves behind a consistent set. To quickly detect such QFs, the following LP approach is employed.

ISOMER associates two "slack" variables with each constraint corresponding to the QFs. The constraints in equation (6) are rewritten as $$(\text{for } 1 \le i \le m) \sum_{i | C(b) \subseteq R(q_i)} n(b) - N(q_i) = s_i^+ - s_i^- \quad (9)$$

ISOMER also adds the nonnegativity constraints $$n(b) \ge 0 \text{ for all } b, s_i^+, s_i^- \ge 0 \text{ for } i=1, \ldots, m. \quad (10)$$

If there is a solution to the set of constraints of equations (9) and (10) such that $s_i^+ = s_i^- = 0$, then the solution satisfies the $i^{th}$ constraint from equation (5). However, if $s_i^+$ or $s_i^-$ is positive, the $i^{th}$ constraint is not satisfied. Ideally, it would be best to have a solution that satisfies the maximum number of constraints from equation (5), i.e., a solution that minimizes the number of nonzero slack variables. Unfortunately, determining such a maximum satisfiable subset from a set of constraints is known to be an NP-complete problem (see "The Complexity and Approximability of Finding Maximum Feasible Subsystems of Linear Relations", Amaldi, E. & Kann, V., Theoretical computer Science, pp 181-210, 1995). ISOMER instead settles for minimizing the sum of the slack variables, because this problem can be solved by linear programming. ISOMER then eliminates all those constraints having nonzero slack. Note that if all the original constraints from equation (5) are satisfiable, then there exists a solution in which all of the slacks equal 0, and hence no constraints shall be eliminated.

As noted earlier, older QFs should preferentially be discarded. Instead of minimizing the simple sum of slack variables, ISOMER therefore minimizes a weighted sum of the slack variables, where the slack corresponding to the $i^{th}$ QF is weighted inversely by the age of the QF. Thus, a QF that is not satisfied and has nonzero slack incurs a smaller objective-function penalty if it is old than if it is new. Thus an optimal solution is more likely to permit slack in older QFs, so that such QFs are preferentially discarded. The age of the $i^{th}$ QF is given by m−i+1. Thus ISOMER solves the following linear program to detect inconsistent constraints: Minimize $$\sum_{i=1}^{m} (1/(m-i+1))(s_i^+ + s_i^-)$$

subject to equations (9) and (10). If $s_i^+$ or $s_i^-$ is nonzero in the resulting solution, then the $i^{th}$ QF is discarded. In a preferred embodiment, the highly optimized open source Coin LP solver is used. Discarding QFs enables ISOMER to merge buckets as will be described further.

Once ISOMER has decided to discard a particular QF, the total histogram size can potentially be reduced by merging two or more histogram buckets. The process of merging buckets is essentially the inverse of the process for adding holes described above and is similar to that described in STHoles. Only a brief description is given here. After the ith QF is discarded, ISOMER examines all "top-level" buckets that cover $R(q_i)$, i.e., all buckets b such that $C(b) \subseteq R(q_i)$, but $C(\text{parent}(b)) \not\subseteq R(q_i)$. Bucket b can be merged with another bucket in the following cases:

- If bucket b has exactly the same referring set as its parent, i.e., if $\{j|C(b) \subseteq R(q_j)\} = \{j|C(\text{parent}(b)) \subseteq R(q_j)\}$, then b can be merged with its parent. This is because both b and parent(b) have the same number of tuples per unit volume in the maximum-entropy solution; cf. equation (7). The children of b now become the children of parent(b).
- If there is a sibling b' of b such that (i) b' and b have the same referring set and (ii) box(b')∪box(b) is hyperrectangular, then b and b' can be merged. The children of b are recursively examined to see if they can be merged with their new siblings, i.e., children of b'. The new merged bucket is also examined to see if it can be merged with any of its siblings.

In most practical settings there is limited space available for histogram storage. However, the addition of new QFs causes the size of ISOMER's histogram to grow as new holes are added for the new QF. Thus we cannot continue to add QFs indefinitely. At some pint the histogram size exceeds the limited space budget. ISOMER reduces the histogram size by eliminating relatively "unimportant" QFs. Intuitively, a QF is unimportant if it provides little information over and above what is already provided by other QFs. Discarding unimportant QFs reduces the total histogram size by merging some buckets without affecting the solution significantly.

EXAMPLE 4

In the running example, suppose that there is space to store only two histogram buckets. After adding the QFs N=100 and N(make='Honda')=80, the resulting histogram has two buckets, and is shown in FIG. 7(a). Each bucket has volume equal to 2, and bucket $b_2$ is a hole in the top-level bucket $b_1$. Suppose that the third QF, N(make='BMW', color='white')=10 is now added. ISOMER adds a hole corresponding to this QF, and the resulting histogram, shown in FIG. 7(b), has three buckets, violating the space budget. Notice, however, that the addition of this third QF yields no extra information: because tuples are assumed to be uniformly distributed within a bucket, the histogram in FIG. 7(b) is already implied by the histogram in FIG. 7(a). Thus the third QF is unimportant, and can be eliminated.

How can the unimportant QFs be efficiently determined? Note that the age of a QF, which ISOMER uses as criteria for deciding which QFs are invalid, is not relevant for deciding importance. For instance, in Example 4, ISOMER could receive many instances of the third QF in succession, thus making the second QF very old. However, the second QF is still more important than the third QF.

An elegant aspect of ISOMER is that the maximum entropy solution yields, for free, an importance measure for each QF. This leads to a very efficient procedure for detecting and eliminating unimportant QFs. Note that if $\lambda_i=1$ in equation (7), then removal of the $i^{th}$ QF does not affect the bucket counts, so that the final maximum-entropy solution is unaltered. For instance, $\lambda_3=1$ in the final solution in Example 4 (see FIG. 7(b)) and it can be concluded that the third QF was unimportant. By the same token, if the multiplier corresponding to a QF is close to 1, then removal of that QF will affect the final solution less than if a QF whose multiplier is much greater than 1 is removed. Thus, those QFs having multipliers closest to 1 should be selectively eliminated.

A justification for the above follows from the fact that $\lambda_i$ is the exponent of the Lagrange multiplier $y_i$ corresponding to the ith constraint in the maximum-entropy optimization problem. It is well known in optimization theory that the Lagrange multiplier for a constraint measures the degree to which the constraint affects the optimum value of the objective function. Thus $|y_i|$ measures how much the ith constraint affects the entropy, i.e., the amount of information in the distribution. In other words, $|y_i|=|\ln(\lambda_i)|$ is a measure of the amount of information carried by the ith constraint, and hence a measure of the importance of the ith QF.

Thus, whenever the histogram exceeds the space budget, ISOMER proceeds by examining the current maximum entropy solution and, for each i, computes the following:

importance measure for the $i$th $QF=|\ln(\lambda_i)|$

Note that is the importance measure is least when $\lambda_i=1$. ISOMER then discards the QF with the least importance according to this measure and merges buckets as described above. ISOMER then incrementally computes the new maximum-entropy solution and repeats the above procedure until the space budget is met.

An overview of the stages of ISOMER is as follows:
Algorithm ISOMER (chunk)
Chunk: Number of QFs to be added in a batch
φ: Set of QFs (persisted in offline store)
Initialization:
1. initialize histogram with bucket $b_1$, $C(b_1)=S$
2. φ={n($b_1$)=N}
On invocation of ISOMER:
1. read histogram from database stats, φ from offline store
2. while (more QFs remaining)
3. for l=1 to chunk do
4. get a new QF and add it to φ
5. add holes for new QF
6. delete inconsistent QFs from φ
7. merge buckets
8. compute maximum entropy solution
9. while histogram size>space budget
10. delete least important QF from φ
11. merge buckets
12. recomputed maximum entropy solution
13. persist final histogram to database, φ to offline store ISOMER takes one parameter, chunk. This parameter affects the running time of ISOMER as follows. Most of the ISOMER cost lies in steps 6-12, i.e. solving the linear program in step 6, and repeated iterative scaling to recomputed the maximum entropy solution in the loop of steps 9-12. If the value of chunk is very low, then this cost is incurred after addition of every few QFs, which tends to increase the overall running time. However, a high value of chunk is not desirable either. If the value of chunk is very high, then the histogram has a large number of buckets at the beginning of step 6 (due to the addition of a large number of QFs). Consequently, a much bigger linear program needs to be solved in step 6. Also, the loop in steps 9-12 must be executed a larger number of times to bring the histogram back to within the space budget. Experimentally, it was found that a moderate value of chunk such as 15-20 performs the best in practice.

ISOMER has been described, an algorithm for maintaining multidimensional histograms using query feedback. ISOMER uses the information-theoretic principle of maximum entropy to refine the histogram based on query feedback gathered over time. Unlike previous proposals for feedback-driven histogram maintenance, which lack either robustness (e.g., STGrid, see "Self-Tuning Histograms: Building Histograms Without Looking at Data", Aboulnaga, A. & Chaudhuri, S., Proceedings of the ACM SIGMOD International Conference on Management of Data, pp181-192, 1999), or efficiency (e.g., STHoles, see "Random Sampling for Histogram Construction: How Much is Enough?", Chaudhuri, S., Motwani, R. & Narasayya, V., Proceedings of the ACM SIGMOD International Conference on Management of Data, 1998), ISOMER is both reasonably efficient and robust to changes in the underlying data. ISOMER can be extended in several ways to increase its utility in a database system. First, to handle a large number of attributes, ISOMER can be combined with techniques based on graphical models; such techniques divide the set of attributes into correlated subsets and maintain multidimensional statistics only for these subsets. Second, ISOMER can be extended to build histograms even on attributes in different tables, by using statistical views. Finally, ISOMER can be combined with a proactive approach in order to increase its robustness for queries that refer to data that has not been previously queried.

Additionally, the present invention provides for an article of manufacture comprising computer readable program code contained within implementing one or more modules to optimize queries for database access. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) gathering feedback from the query execution engine about the observed cardinality of predicates; (b) constructing and maintaining multidimensional histograms approximating the true data distribution by a histogram distribution that is as "simple" as possible while being consistent with the observed predicate cardinalities; (c) automatically detecting and eliminating inconsistent feedback; and (d) satisfying a space budget by removing unimportant feedback.

CONCLUSION

A system and method has been shown in the above embodiments for the effective implementation of a Consistent Histogram Maintenance Using Query Feedback. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of programming.

What is claimed is:

1. A computer-based method of maintaining a histogram comprising a plurality of buckets, said method as implemented in a database system comprising the steps of:
    gathering query feedback records from a query execution engine;
    adding new buckets corresponding to said gathered feedback records to said histogram according to a principle of maximum entropy, said principle of maximum entropy approximating a true data distribution by a simple distribution that is consistent with valid query feedback records, said simple distribution approximated by limiting the total number of buckets to a predetermined budget by eliminating query feedback records having lowest values of a measure of importance until said predetermined budget is met, and
    outputting said approximated simple distribution.

2. The method according to claim 1, wherein:
    said approximating further comprising solving a maximum entropy constraint optimization problem for a Lagrange multiplier $\lambda_i$; and
    said measure of importance for an $i^{th}$ query is as an absolute value of a natural logarithm of said Lagrange multiplier $\lambda_i$.

3. The method according to claim 2, further comprising the steps of:
    storing previous values of said Lagrange multiplier;
    solving said maximum entropy constraint optimization problem only for a region of said histogram corresponding to a new query feedback record and for regions of said histogram intersecting therewith; and
    computing a new value of said Lagrange multiplier for said new query feedback record.

4. The method of claim 2, further comprising the step of:
    caching values of bucket multipliers employed in each constraint of said maximum entropy constraint optimization problem, so that said bucket multipliers need not be computed each time said maximum entropy constraint optimization problem is solved.

5. The method of claim 1, further comprising the step of:
    removing by linear programming query feedback records that are inconsistent with existing query feedback records.

6. The method according to claim 5, further comprising:
    generating a series of slack variables corresponding to each query feedback record;
    setting each said slack variable to be non-negative;
    minimizing a sum of said slack variables; and
    discarding query feedback records for which a corresponding slack variable is non-zero.

7. The method of claim 6 further comprising a step of:
    weighting each said slack variable in said sum of slack variables in accordance with an age of a corresponding query feedback record.

8. The method of claim 1, further comprising the steps of:
    merging a first bucket with a second bucket, said first bucket having a same referring set as said second bucket.

9. The method of claim 8 wherein:
    said first bucket is a bucket selected from a group consisting of a child bucket of said second bucket or a sibling bucket of said second bucket; wherein:
    said child bucket of said second bucket is completely contained within said second bucket; and
    said second bucket and said sibling bucket of said second bucket are each completely contained within a common parent bucket.

10. The method of claim 1, further comprising the step of:
    storing said query feedback records in an offline store, said offline store not read by said query execution engine.

11. A computer readable medium having computer executable instructions for performing steps for maintaining a histogram comprising a plurality of buckets, said medium comprising:
    computer readable program code gathering query feedback records from a query execution engine;
    computer readable program code adding new buckets corresponding to said gathered feedback records to said histogram according to a principle of maximum entropy, said principle of maximum entropy approximating a true data distribution by a simple distribution that is consistent with valid query feedback records, said simple distribution approximated by limiting the total number of buckets to a predetermined budget by eliminating query feedback records having lowest values of a measure of importance until said predetermined budget is met, and
    computer readable program code outputting said approximated simple distribution.

12. The computer readable medium according to claim 11, wherein:
    for an $i^{th}$ query said measure of importance is an absolute value of a natural logarithm of a Lagrange multiplier $\lambda_i$ as computed by solving a maximum entropy constraint optimization problem.

13. The computer readable medium according to claim 12, further comprising:
    computer readable program code storing previous values of said Lagrange multiplier;
    computer readable program code solving said maximum entropy constraint optimization problem only for a region of said histogram corresponding to a new query feedback record and for regions of said histogram intersecting therewith; and
    computer readable program code computing a new value of said Lagrange multiplier for said new query feedback record.

14. The computer readable medium of claim 12, further comprising:
    computer readable program code caching values of bucket multipliers employed in each constraint of said maximum entropy constraint optimization problem, so that said bucket multipliers need not be computed each time said maximum entropy constraint optimization problem is solved.

15. The computer readable medium of claim 11, further comprising:

computer readable program code for removing by linear programming query feedback records that are inconsistent with existing query feedback records.

16. The computer readable medium according to claim 15, further comprising:
computer readable program code generating a series of slack variables corresponding to each query feedback record;
computer readable program code setting each said slack variable to be non-negative; computer readable program code minimizing a sum of said slack variables; and
computer readable program code discarding query feedback records for which a corresponding slack variable is non-zero.

17. The computer readable medium of claim 16 further comprising:
computer readable program code weighting each said slack variable in said sum of slack variables in accordance with an age of a corresponding query feedback record.

18. The computer readable medium of claim 11, further comprising:
computer readable program code merging a first bucket with a second bucket, said first bucket having a same referring set as said second bucket.

19. The computer readable medium of claim 18 wherein:
said first bucket is a bucket selected from a group consisting of a child bucket of said second bucket or a sibling bucket of said second bucket; wherein:
said child bucket of said second bucket is completely contained within said second bucket; and
said second bucket and said sibling bucket of said second bucket are each completely contained within a common parent bucket.

20. The computer readable medium of claim 11, further comprising:
computer readable program code storing said query feedback records in an offline store, said offline store not read by said query execution engine.

21. In a database system, an apparatus for maintaining a histogram comprising a plurality of buckets, comprising:
means for gathering query feedback records from a query execution engine;
means for adding new buckets corresponding to said gathered feedback records to said histogram according to a principle of maximum entropy, said principle of maximum entropy approximating a true data distribution by a simple distribution that is consistent with valid query feedback records, said simple distribution approximated by limiting the total number of buckets to a predetermined budget by eliminating query feedback records having lowest values of a measure of importance until said predetermined budget is met, and
means for outputting said approximated simple distribution.

22. The apparatus according to claim 21, wherein:
for an $i^{th}$ query said measure of importance is an absolute value of a natural logarithm of a Lagrange multiplier $\lambda_i$ as computed by solving a maximum entropy constraint optimization problem.

23. The apparatus according to claim 22, further comprising:
means for storing previous values of said Lagrange multiplier;
means for solving said maximum entropy constraint optimization problem only for a region of said histogram corresponding to a new query feedback record and for regions of said histogram intersecting therewith; and
means for computing a new value of said Lagrange multiplier for said new query feedback record.

24. The apparatus of claim 22, further comprising:
means for caching values of bucket multipliers employed in each constraint of said maximum entropy constraint optimization problem, so that said bucket multipliers need not be computed each time said maximum entropy constraint optimization problem is solved.

25. The apparatus of claim 21, further comprising:
means for removing by linear programming query feedback records that are inconsistent with existing query feedback records.

26. The apparatus according to claim 25, further comprising:
means for generating a series of slack variables corresponding to each query feedback record;
means for setting each said slack variable to be non-negative;
means for minimizing a sum of said slack variables; and
means for discarding query feedback records for which a corresponding slack variable is non-zero.

27. The apparatus of claim 26 further comprising:
means for weighting each said slack variable in said sum of slack variables in accordance with an age of a corresponding query feedback record.

28. The apparatus of claim 21, further comprising:
means for merging a first bucket with a second bucket, said first bucket having a same referring set as said second bucket.

29. The apparatus of claim 28 wherein:
said first bucket is a bucket selected from a group consisting of a child bucket of said second bucket or a sibling bucket of said second bucket; wherein:
said child bucket of said second bucket is completely contained within said second bucket, and
said second bucket and said sibling bucket of said second bucket are each completely contained within a common parent bucket.

30. The apparatus of claim 21, further comprising:
means for storing said query feedback records in an offline store, said offline store not read by said query execution engine.

* * * * *